(12) United States Patent
Becher et al.

(10) Patent No.: US 11,001,454 B2
(45) Date of Patent: May 11, 2021

(54) END-POINT DEVICE FOR A SORTING AND PICKING SYSTEM

(71) Applicant: Hansueli Christen, Zeihen (CH)

(72) Inventors: Jörn Becher, Mainz (DE); Hansueli Christen, Zeihen (CH)

(73) Assignee: Hansueli Christen, Zeihen (CH)

( * ) Notice: Subject to any disclaimer, the term of this patent is extended or adjusted under 35 U.S.C. 154(b) by 0 days.

(21) Appl. No.: 16/471,095

(22) PCT Filed: Dec. 16, 2017

(86) PCT No.: PCT/DE2017/000426
§ 371 (c)(1),
(2) Date: Jun. 19, 2019

(87) PCT Pub. No.: WO2018/113811
PCT Pub. Date: Jun. 28, 2018

(65) Prior Publication Data
US 2020/0017312 A1   Jan. 16, 2020

(30) Foreign Application Priority Data

Dec. 19, 2016   (DE) ..................... 10 2016 015 061.0

(51) Int. Cl.
*B65G 47/51* (2006.01)
*B65G 21/12* (2006.01)
*B65G 1/137* (2006.01)

(52) U.S. Cl.
CPC ......... *B65G 47/519* (2013.01); *B65G 1/1378* (2013.01); *B65G 21/12* (2013.01);
(Continued)

(58) Field of Classification Search
CPC .. B65G 1/1378; B65G 47/519; B65G 11/081; B65G 11/123; B65G 21/12;
(Continued)

(56) References Cited

U.S. PATENT DOCUMENTS 4,284,187 A * 8/1981 Kramer .............. B65G 47/5186
                                              198/435
4,909,697 A * 3/1990 Bernard, II .......... B65G 1/0485
                                              187/255

(Continued)

FOREIGN PATENT DOCUMENTS

AT       403156 B    11/1997
EP       0005740 A1  12/1979
(Continued)

*Primary Examiner* — Mark A Deuble
(74) *Attorney, Agent, or Firm* — Hudak, Shunk & Farine Co., LPA

(57) ABSTRACT

A terminal device for a sorting and order-picking system, wherein the terminal device has at least one transport device having a charge side and a discharge side wherein on the charge side goods of a conveying means can be loaded and stored on the transport devices until the end of a loading cycle. The terminal device, can be integrated into existing sorting and picking systems without costly conversion measures and also enables the largest possible storage capacity for the goods, wherein at least the charge side of the transport device is lowered during the loading cycle from an upper position ($H_o$) to a lower position ($H_u$).

21 Claims, 4 Drawing Sheets

(52) U.S. Cl.
CPC ........... *B65G 2201/0285* (2013.01); *B65G 2203/0241* (2013.01); *B65G 2203/044* (2013.01)

(58) Field of Classification Search
CPC ........ B65G 47/5104; B65G 2201/0285; B65G 2203/0241; B65G 2203/042; B65G 2203/044; B65G 47/643; B65G 47/647
See application file for complete search history.

(56) References Cited

U.S. PATENT DOCUMENTS

| | | | |
|---|---|---|---|
| 9,278,809 B2 | 3/2016 | Lykkegaard et al. | |
| 2004/0253082 A1* | 12/2004 | Mathys | B65G 1/1378 414/280 |
| 2017/0362039 A1* | 12/2017 | Eisenberg | B65G 47/46 |
| 2018/0144285 A1* | 5/2018 | Hoffman | B65G 47/42 |
| 2018/0264521 A1* | 9/2018 | Chapelet | B65G 47/644 |
| 2018/0305123 A1* | 10/2018 | Lert, Jr. | G05D 1/0287 |
| 2019/0002203 A1* | 1/2019 | Schitthelm | B65G 37/00 |
| 2019/0300286 A1* | 10/2019 | Hognaland | B65G 1/1378 |
| 2020/0048005 A1* | 2/2020 | Kraetsch | B65G 1/1378 |

FOREIGN PATENT DOCUMENTS

| | | | |
|---|---|---|---|
| EP | 2354051 A1 | 8/2011 | |
| EP | 2740690 A1 | 6/2014 | |
| EP | 2865620 A1 | 4/2015 | |
| GB | 1501535 A | 2/1978 | |
| JP | S59124230 A | 7/1984 | |
| JP | H05278722 A | 10/1993 | |

* cited by examiner

END-POINT DEVICE FOR A SORTING AND PICKING SYSTEM

FIELD OF THE INVENTION

The invention relates to a terminal device for a sorting and picking system, the terminal device comprising at least one transport device having a charge side and a discharge side, wherein on the charge side goods of a conveying means can be loaded and stored on the transport device until the end of a loading cycle.

BACKGROUND OF THE INVENTION

Such terminal devices are used wherever goods are picked, sorted or distributed, such as in mail distribution centres. The goal is always to maximize the storage capacity of such a terminal device to reduce dead times of upstream equipment and thus to increase their utilization. At the same time the aim is to keep the personnel on the customer side of the terminal device as low as possible.

EP 2 865 620 A1 discloses a sorting and picking system with a terminal device, which has a first transport device and a second transport device, wherein the second transport device defines a storage path for the goods. After loading of the second transport device, the delivery side of the first transport device is gradually raised by means of a lifting device and sequentially more goods are added on the second transport device in a second and optionally further level(s). A disadvantage has been found in this known system that retrofitting into existing systems is difficult to implement and thus a significant production loss is expected in case of a conversion. Moreover, only one of the two transport devices participates in the storage of articles during a loading cycle.

U.S. Pat. No. 9,278,809 B2 describes a system formed by several chutes for luggage. The angle of inclination of each chute is variably adjustable to increase it when a piece of luggage on the chute comes to a halt, or to decrease when a piece of luggage on the chute becomes too fast. Since the angle of inclination of the chutes is dependent on the speed of the individual piece of luggage thereon, and also reacts to an insufficient speed or a piece of luggage with an increase in the angle of inclination, not several pieces of luggage can be stored simultaneously on the chutes.

Document AT 403 156 B shows a racking system with several side by side and superimposed ramps for transporting container located thereon. If a particular ramp is already filled with, for example, five containers, more containers are prevented from passing into that ramp by a mechanical lock. This results in the disadvantage that only a few containers can be cached side by side on a ramp.

SUMMARY OF THE INVENTION

Therefore, the underlying object of the invention is to provide a terminal device, which can be integrated into existing sorting and picking systems without costly conversion measures and also enables the largest possible storage capacity for the goods.

The underlying object of the invention is solved with the features of the terminal device comprising at least one transport device having a charge side and a discharge side, wherein on the charge side goods of a conveying means can be loaded and stored on the transport device until the end of a loading cycle, wherein at least the charge side of the transport device is lowered during the loading cycle from an upper position ($H_o$) to a lower position ($H_u$). In the upper position, the at least one transport device can be aligned with the conveying means on the upstream side and items of goods located on the transport device can be moved from a charge side to a discharge side. The vertical level of the discharge side of the upstream conveying means is always higher than the charge side of the respective transport device, so that the goods arrive during a loading cycle without further aids to the downstream transport device.

If, for example, an unloading table arranged at an end of the sorting and picking system or a downstream transport device is completely loaded with goods, additional storage space is required for the goods. This additional storage space provides the transport device itself by at least bringing the charge side of the transport device into to a lower position so that pieces of goods can be stored in multiple layers on the transport device. In the lower position, the transport device delivers no goods, but only serves as a storage surface or storage space for this. Such a loading cycle begins with the first good, stored stationary on the transport device, and ends after reaching a predetermined maximum loading height of goods. The loading cycle is followed by a time-staggered unloading of the transport device, in which the goods leave their stationary position on the transport device.

The charge side of the transport device can be mounted pivotably and optionally adjustable with a variable angle of inclination. A pivoting of the charge side is understood to mean a rotational movement of the at least one transport device about a point of rotation spaced from the charge side. Advantageously, the pivot point is arranged stationary relative to the transport device. The transport device is usually inclined in the conveying direction.

By lowering the charge side the storage space is effectively increased because a pivoting takes place in the opposite direction of the inclination of the transport device and thereby the usually available free space under the transport device is used to the maximum.

Preferably, the upper position of the charge side is lowerable below a level of the discharge side. This creates a storage space with maximum size, which is also optimally utilized, since the goods slide downwards against the conveying direction and thereby gaps are reduced between the pieces of goods. Under the conveying direction of the transport device is basically understood the direction from the charge side to the discharge side.

Particularly favorable is an embodiment in which the at least one transport device is pivotally mounted about its discharge side. Basically, the pivot point can be provided comparable to a rocker somewhere between the charge side and the discharge side. Due to an end-side arrangement of the fulcrum in the region of the discharge side, the transport device pivots about the discharge side, whereby the drop height is selected for the goods during the delivery as low as possible and the risk of damage to the goods is reduced.

As an alternative to a section-wise lowering of the transport device, in particular by means of a pivotable mounting, the charge side can also be mounted translationally lowerable and liftable together with the entire transport device. In this embodiment, not only the charge side, but the entire transport device is first lowered for storing goods and raised to empty again. A translation is a movement in which all points of the conveyor undergo the same displacement. At a given time, speeds and accelerations of all points are identical. In this embodiment, the bearing of the transport device allows exactly two degrees of freedom.

The discharge side of a first transport device expediently adjoins the charge side of a second transport device, in which case the upstream conveying means is formed of the first transport device. In this case, at least two transport devices are connected in series, wherein in each case the transport device arranged opposite to the conveying direction forms the upstream conveying means. By arranging a plurality of transport devices in row, the total storage space available for the goods can be expanded.

According to a particularly advantageous embodiment, a substantially vertically aligned holdback wall is arranged between the charge side of the transport device and the discharge side of the upstream conveying means. The holdback wall prevents a slipping down of goods in the lower position of the transport device, in particular against the conveying direction. With the lowering of the charge side from the upper position adjacent goods are contacting the holdback wall on one side. The holdback wall can be arranged stationary and allow swivelling of the transport device. It is also conceivable that the holdback wall is formed from a plurality of telescopic wall elements and engages the transport device and/or the upstream conveying means. According to a further alternative embodiment, the holdback wall may also be an elastic network which is stretched between the transport device and/or the upstream conveying means.

The transport device and the holdback wall preferably form the storage space for the goods.

Preferably, the charge side and/or the entire transport device can be moved by means of a drive unit between the upper position and the lower position. The drive unit may in particular comprise a preferably electrically driven servomotor.

According to a first preferred embodiment, the drive unit may be connected to the charge side of the transport device. This results in favorable leverage ratios and a small dimensioning drive unit for the embodiment with a pivotable mounting of the transport device. In addition, sequentially different altitudes of the charge side can be approached particularly accurately due to the relatively long travel path.

For the embodiment with a translationally lowerable and liftable transport device, the drive unit can preferably act on the transport device in the area or on both sides of its centre of mass in order to avoid a tilting movement of the transport device.

Conveniently, the drive unit also comprises a fluid cylinder and/or a linear drive. In this embodiment, the servomotor may cooperate with a hydraulic pump and provide a corresponding fluid pressure for the fluid cylinder or cylinders. Under a linear drive or a linear drive system, all drive systems are referred to, which lead to a translational movement. Linear drives allow the movement of machines and equipment in a straight line or another predetermined course. In particular, the fluid cylinder allows a continuous approach to the intended altitude of the charge side. This embodiment is preferably suitable for a terminal device in which there is sufficient space under the transport device.

According to a second preferred embodiment, a gallows is arranged above the transport device and the drive unit cooperates with a drum and a rope laid thereon, the drive unit or a pulley being fastened to the gallows. In this embodiment, the servomotor may comprise an electric motor, in particular a controllable DC motor, which is connected to the drum. With the help of the pull rope the altitude of the charge side between upper and lower position is infinitely adjustable. This embodiment is preferably suitable for a terminal device in which there is sufficient space above the transport device.

A hybrid form of the two proposed embodiments is also conceivable in which a fluid cylinder is arranged between the gallows and the transport device.

Advantageously, a loading height sensor is arranged on the charge side and/or the discharge side of the at least one transport device. The loading height sensor detects in real time the current loading height of the goods on the respective transport device. The loading height sensor should be arranged stationary and allow a swivelling of the transport device during the lowering of the charge side. As a result, a layered stacking of pieces of goods on the transport device can be realized with the help of the loading height sensor.

The loading height sensor may be formed by a light barrier, a light sensor and/or an ultrasonic sensor. The term light barrier is a generic term for a system in which the interruption of a light beam is detected and displayed as an electrical signal in order to be able to detect moving objects without contact.

With through-beam sensors, transmitter and receiver face each other. In a reflex photoelectric sensor, transmitter and receiver are parallel to each other in a common housing and the light signal is reflected on the opposite side of a reflector. In a reflex light scanner, the light signal is reflected by the object to be detected itself. The switching distance is therefore dependent on the reflection properties of the object surface. Transmitter and receiver are also located here parallel to each other in a common housing. The ultrasonic sensor also performs distance measurements based on the principle of transit time measurement of high-frequency sound pulses. In this case, a high-frequency sound pulse is emitted by the ultrasonic sensor at regular intervals, which propagates in the speed of sound in the air. Ultrasound refers to sound with frequencies above the audible frequency range of humans. It includes frequencies from about 16 kHz. When the ultrasonic pulse hits an object, it is reflected by it. As a result, an echo arises. This echo is picked up by the ultrasonic sensor. The time between transmission of the pulse and interception of the echo is used to calculate the distance to the object and thereby closed to the loading height.

It makes sense to have a plurality of transport devices whose associated loading height sensor(s) and their respective drive unit are connected to an electronic control unit and when exceeding a predetermined loading height of the first triggering load height sensor initiates a lowering of the associated charge side. During operation, the last conveying device in the conveying direction or, if present, an unloading table is typically loaded with pieces of goods. If this or these obtain their capacity limit, the predetermined loading height is exceeded and this condition is detected by the loading height sensor.

The electronic control unit then sets the associated drive unit in operation to pivot the charge side or the entire transport device, which is located before in the conveying direction, from an upper position to a lower position.

Once the charge side swung down from the upper position or the transport device is completely lowered, the transport device serves only as storage space and does not transport pieces of goods in direction to the discharge side. In a driven transport device such as a conveyor belt or roller conveyor, the corresponding conveyor drives are inactive. The transportation device or conveying means located upstream in the conveying direction then charge further pieces of product onto the lowered charge side until the associated load sensor again detects that the intended loading height has been exceeded. The charge side or the transport device can then be further lowered and again pieces of goods are loaded onto the transport device. The incremental lowering of the charge side with each subsequent loading of the transport device also contributes to a reduction in the drop height of pieces on the charge side.

The at least one transport device expediently has a transport path from an upper run of a belt conveyor, which is also understood to mean a strip belt conveyor, a roller conveyor, a ball table, a pneumatic table and/or a chute. The transport path always serves as support for the goods. The transport path can be moved by a conveyor drive or have moving elements; this is typically the case with a conveyor belt which runs between two conveyor pulleys, the upper run of which receives the articles of goods and transports them in the conveying direction. In a roller conveyor all or individual rollers can also be driven by a conveyor drive and actively carry out the transport of the goods.

The slide or chute, the ball table or the air table only allows a transport of goods depending on the inclination of the transport path. The advantage of this embodiment lies in the simplicity of the system and its control technology, since only the swinging down from the upper position to the lower position and back needs to be coordinated.

Particular preference is given to terminal devices with transport conveyors moved by a conveyor drive, since during emptying of the terminal device metered items are successively conveyed away from the transport device, without moving the pivotally mounted transport device from its lower position. A swinging back from the lower position into the upper position typically takes place when the transport device is completely emptied of goods. In a passive transport device without a conveyor drive, such as a chute, the emptying of the transport device is achieved exclusively by pivoting back the charge side in the upper position, combined with a risk that the accumulated goods all at once get in motion and impinge with high kinetic energy on the unloading table, which can damage the goods. Moreover, in case of a collective sliding of several pieces of goods, individual pieces of goods more often fall off the transport device.

Appropriately, on both sides of the transport path a sidewall is arranged in the axial extension. The sidewalls allow multi-layered storage of goods while minimizing the risk of lateral loss of individual pieces of goods.

BRIEF DESCRIPTION OF THE DRAWINGS

For a better understanding of the invention will be explained in more detail with reference to seven figures, wherein.

DETAILED DESCRIPTION OF THE INVENTION

Figure 1:
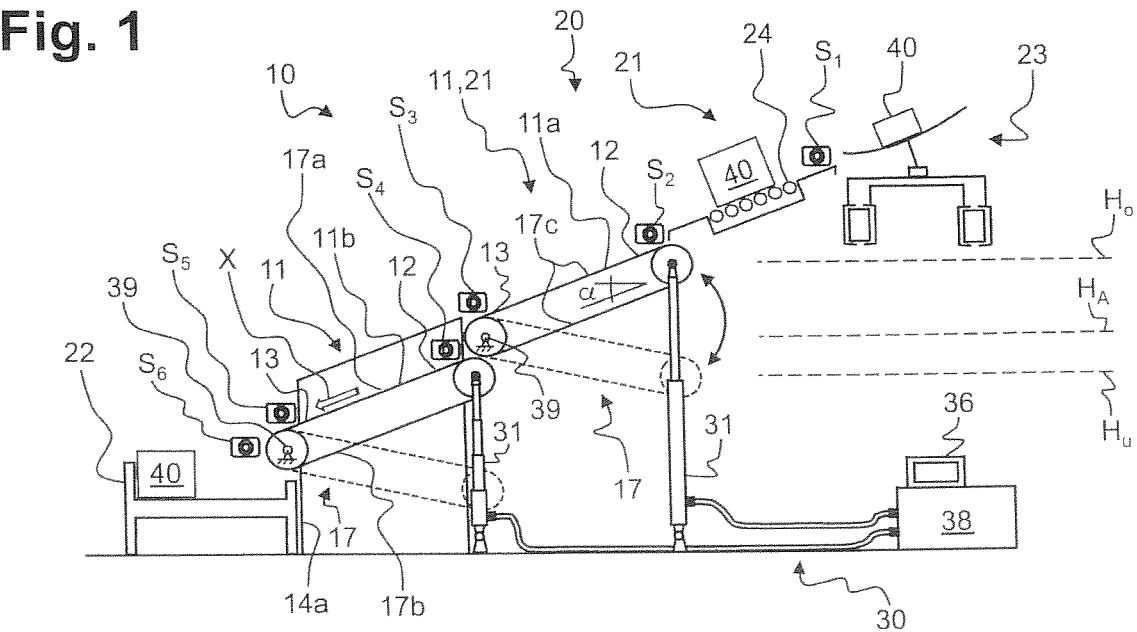
FIG. 1 shows a side view of a terminal device with two transport devices according to a first embodiment in a first functional position.

FIG. 1 shows a terminal device 10 as part of a sorting and picking system 20 at the beginning of a loading cycle. By means of a sorter 23, the terminal device 10 is discontinuously supplied with goods 40, which are firstly placed on an accumulation roller conveyor 24 of the terminal device 10. The accumulation roller conveyor 24 has driven support rollers and reduces the speed of movement of one or several good(s) 40 on it.

From the accumulating roller conveyor 24, the goods 40 reach transport devices 11, namely a first transport device 11a and a second transport device 11b. For the first transport device 11a, the accumulating roller conveyor 24 and for the second transport device 11b the first transport device 11a each represents a conveying means 21.

In the illustrated embodiments of FIGS. 1 to 3 and FIG. 4, the first and second transport devices 11a, 11b each have a belt conveyor 17. Essential part of the belt conveyor 17 is an endless conveyor belt 17c, which is defined by an upper run 17a and a lower run 17b being powered by a motor. The upper run 17a serves as a transport path 16 (see FIG. 2), picks up the goods 40 and transports them at a predetermined speed from a charge side 12 to a discharge side 13 of the respective transport device 11. At the discharge side 13 the goods 40 leave the respective first and second transport device 11a, 11b. In the conveying direction X, the goods 40 pass from the second transport device 11b to an unloading table 22, from which the goods 40 are occasionally picked up by a person by hand.

The accumulation roller conveyor 24 and the first and second transport device 11a, 11b are aligned with each other in their axial extent and are also arranged in cascade to each other such that the goods 40 are handed over without appreciable drop height.

Each transport device 11 is rotatably mounted on the discharge side 13 with a pivot bearing 39 and supported on the opposite charge side 12 via fluid cylinder 31 of a drive unit 30. The drive unit 30 comprises the fluid cylinder 31, which engage on the first and second transport device 11a, 11b and are stationarily mounted at its opposite end, as well as a servomotor 38 to which the fluid cylinders 31 are connected by means of connection lines which are not described in more detail. The servomotor 38 may in particular be a hydraulic pump driven by an electric motor.

By activating the fluid cylinder 31, the charge side 12 of the first and second transport device 11a, 11b is lowered and later raised to the original level again. In the functional position shown in FIG. 1, the loading with pieces of goods 40 on the terminal device 10 begins. At this stage, the fluid cylinders 31 of the first and second transport devices 11a, 11b are fully extended and, accordingly, each of the charge sides 13 is at an upper position $H_o$. For clarity, only the upper position $H_o$ of the first transport device 11a is shown in FIG. 1. The first and second transport devices 11a, 11b have a negative inclination angle $\alpha$, which is spanned between the respective transport device 11, 11a, 11b and a horizontal plane.

As a result, the first and second transport devices 11a, 11b are inclined downwards. The positions of the first and second transport devices 11a, 11b indicated by broken lines correspond to maximum lowered positions of both charge sides 12, which then have taken a lower position $H_u$. The discharge sides 13 of the first and second transport devices 11a, 11b always remain at a constant height level $H_A$. The height level $H_A$ is typically between the upper position $H_o$ and the lower position $H_u$.

In order to prevent the goods 40 from falling off the transport devices 11a, 11b, they are bounded on both sides by sidewalls 14a, of which, for reasons of clarity, only a single sidewall 14a is shown, which is placed in the image plane behind the second transport device 11b. The sidewalls 14a may be fixedly secured to the transport devices 11a, 11b and pivoted together therewith. However, it is preferably also possible to arrange the sidewalls 14a in a stationary manner and to allow the transport devices 11, 11a, 11b to pivot past the sidewalls 14a.

Figure 2:
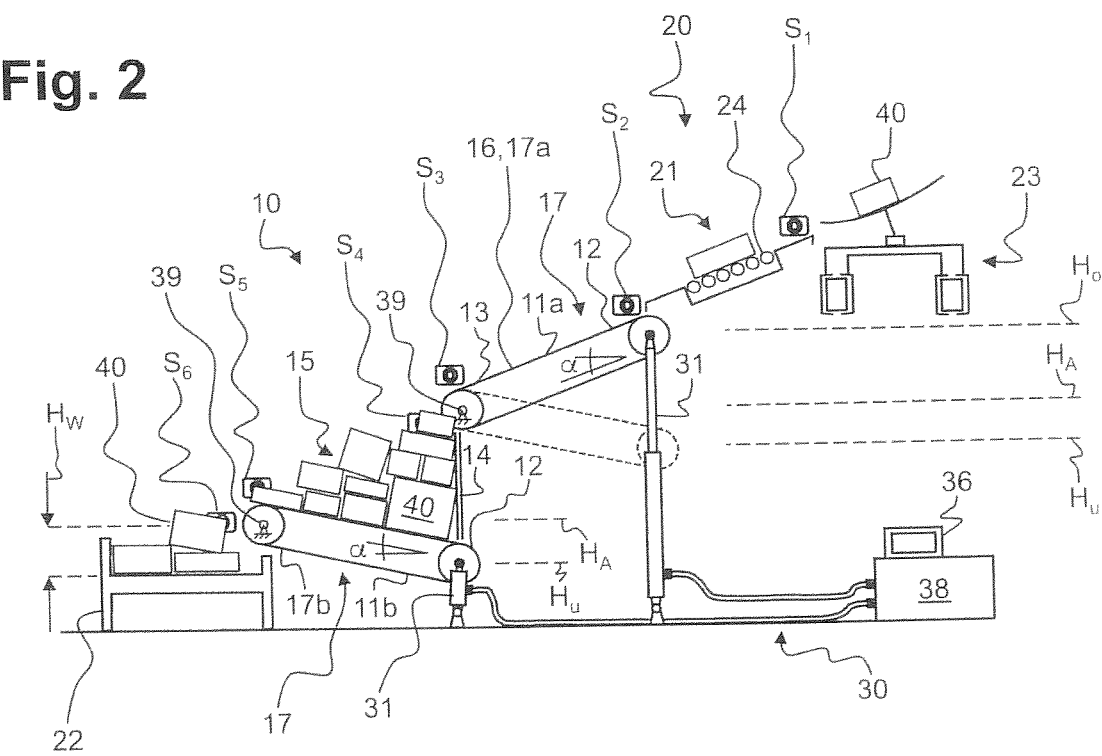
FIG. 2 shows a view of the transport devices according to FIG. 1 in a second functional position.

FIG. 2 shows an advanced functional position of the terminal device 10 with increasing loading by several pieces of goods 40, which already project beyond a predefinable loading height $H_W$ at least of the unloading table 22. For detecting the loading height, a plurality of loading height sensors $S_1$-$S_6$ are arranged in the axial extent of the terminal device 10 and connected to an electronic control unit 36. The loading height in the region of the unloading table 22 has already been detected by the loading height sensor $S_6$ and due to this the belt conveyor 17 of the transport device 11b stopped. By retracting the fluid cylinder 31, the charge side 12 of the second transport device 11b is pivoted about the pivot bearing 39 down to the lower position $H_u$.

The inclination angle α is now positively aligned, that is, the second transport device 11b increases in the conveying direction X (see FIG. 1).

As a result of the lowering pivoting movement of the second transport device 11b, a storage space 15 has been created which, in the representation of FIG. 2, is already filled with goods 40. To prevent goods 40 from falling into the space between the charge side 12 of the second transport device 11b and the discharge side 13 of the first transport device 11a, a substantially vertically aligned holdback wall 14 extends between the first and second transport devices 11a, 11b with those goods 40 lying against that holdback wall 14. Another holdback wall 14 is located in the transition region of the first transport device 11a and accumulation roller conveyor 24 (see FIG. 3).

The loading state of the second transport device 11b is monitored by loading height sensors $S_5$, $S_6$, wherein the loading height sensor $S_5$ is arranged on the discharge side 13 and the loading height sensor $S_4$ on the charge side 12. Both loading height sensors $S_5$, $S_4$ are recognizable covered by goods 40 so that they have triggered and transmitted a corresponding signal to the electronic control unit 36. Thereupon, the electronic control unit 36 stopped the belt conveyor 17 of the first transport device 11a and pivots down the charge side 12 into the functional position shown in FIG. 3.

Figure 3:
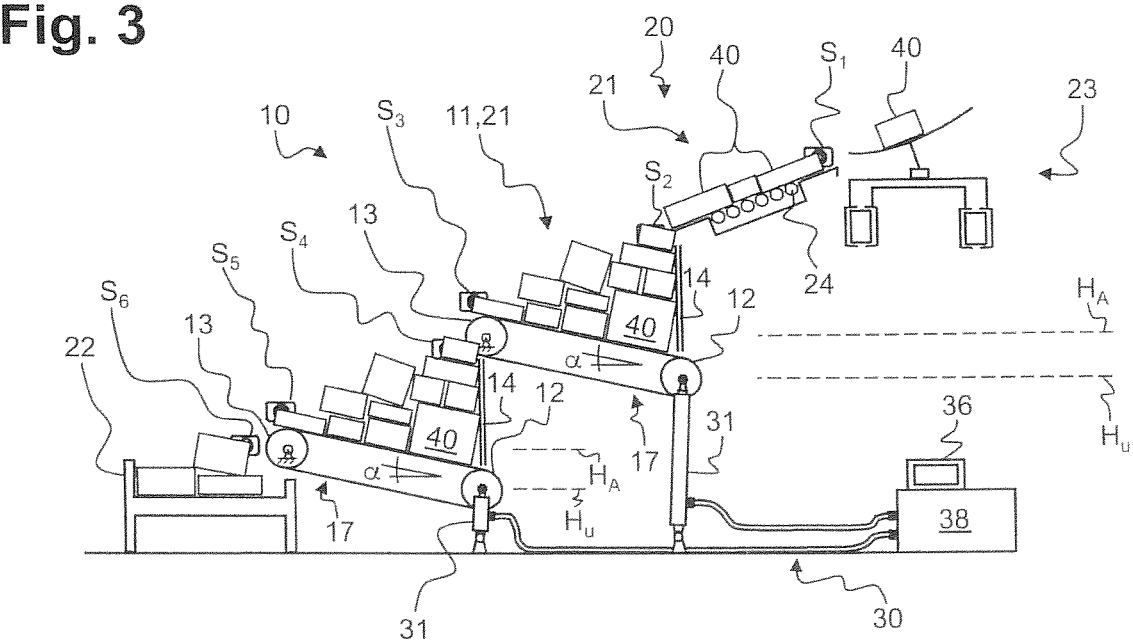
FIG. 3 shows a view of the transport devices according to FIGS. 1 and 2 in a third functional position.

FIG. 3 shows the maximum loading state of the terminal device 10. The first transport device 11a has the same position as the second transport device 11b and is completely covered with partially several layers of goods 40. The loading height sensors $S_3$, $S_2$ identify the complete loading state of the first transport device 11a.

The sorter 23 has then continued conveying until the accumulation roller conveyor 24 is filled with goods 40 up to the loading height sensor $S_1$.

For emptying the terminal device 10, first of all the goods 40 in the region of the removal table 22 are removed and then the second transport device 11b, the first transport device 11a and finally the accumulation roller conveyor 24 are emptied. In order to keep the drop height of the goods 40 as low as possible, the respectively downstream transport device 11 should initially be pivoted back again into the upper position $H_o$.

Figure 4:
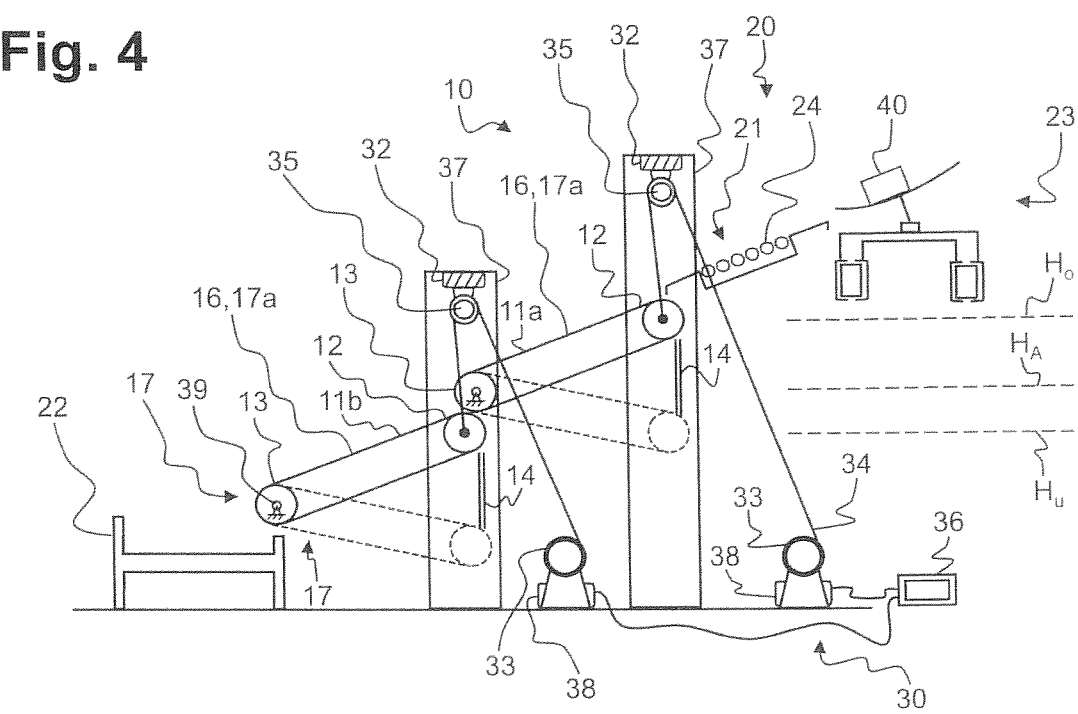
FIG. 4 shows a cross section through a terminal device with two transport devices according to a second embodiment.

FIG. 4 shows an alternative embodiment of the terminal device 10 in the first functional position. Notwithstanding the embodiment illustrated in FIG. 1 to FIG. 3, instead of fluid cylinders 31, stationary pedestals 37 are arranged in the region of the respective charge sides 12, which project upwards above the first and second transport devices 11a, 11b. A gallows 32 is mounted at each of the pedestals 37, which projects across the respective transport device 11, 11a, 11b and carries a rotatably mounted pulley 35. A hawser 34 is put on the pulley 35 and fixed with its first end in the region of the charge side 12 to the transport device 11, 11a, 11b. A second end of the hawser 34 is attached to a drum 33, which up- or unrolls the hawser 34 by operation of the servomotor 38 and thereby allows pivoting the charge sides 12 of the first and second transport devices 11a, 11b in the lower position $H_u$ and back into the upper position $H_o$.

Figure 5:
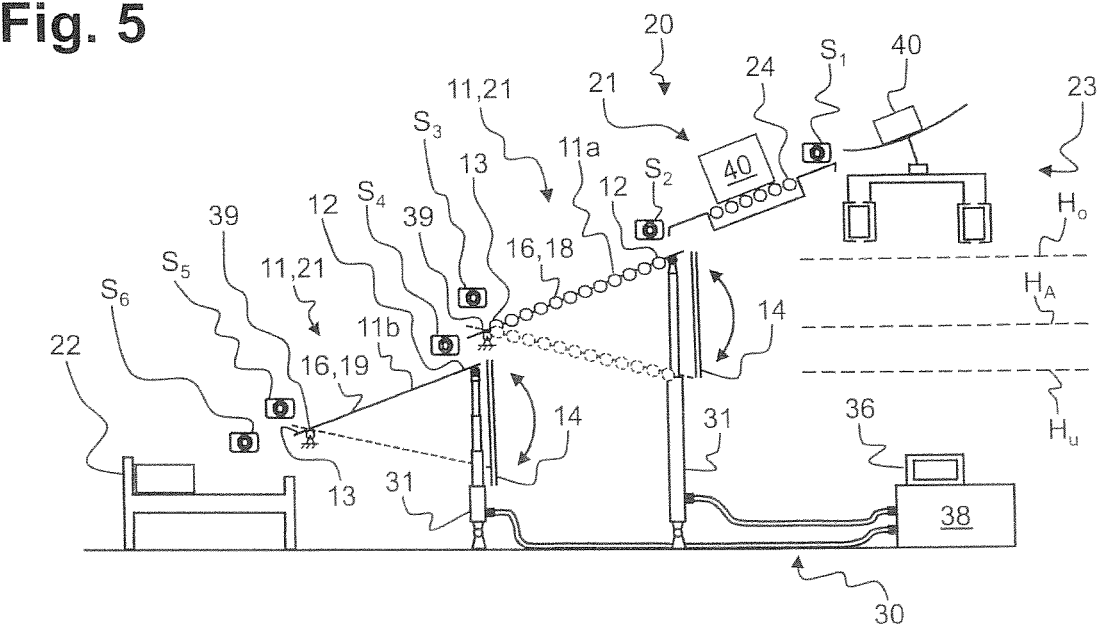
FIG. 5 shows a side view of a terminal device with two transport devices according to a third embodiment.

In FIG. 5, by way of example, the transport paths 16 of the first transport device 11a is formed from a non-driven roller conveyor 18 and those of the second transport device 11b is formed from a chute 19. For emptying the terminal device 10 according to FIG. 5, first the chute 19 of the second transport device 11b is lifted by means of the fluid cylinder 31 until all of the goods 40 have slipped onto the unloading table 22. At the latest when the height level $H_A$ of the discharge side 13 of the first transport device 11a is exceeded, the goods 40 deposited thereon begin to slip in the direction of the unloading table 22.

Figure 6:
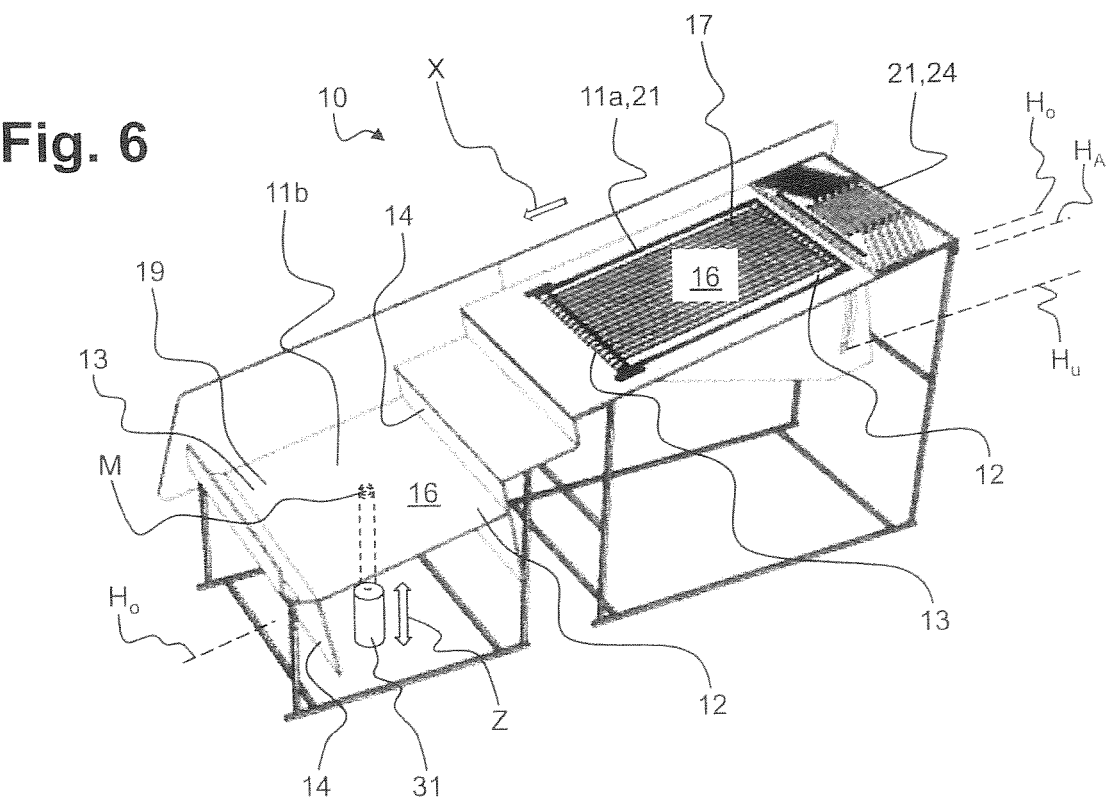
FIG. 6 shows a perspective view of a terminal device with two transport devices according to a fourth embodiment in a first functional position and FIG. 7 shows a perspective view of the terminal device with the transport devices according to FIG. 6 in a second functional position.
Figure 7:
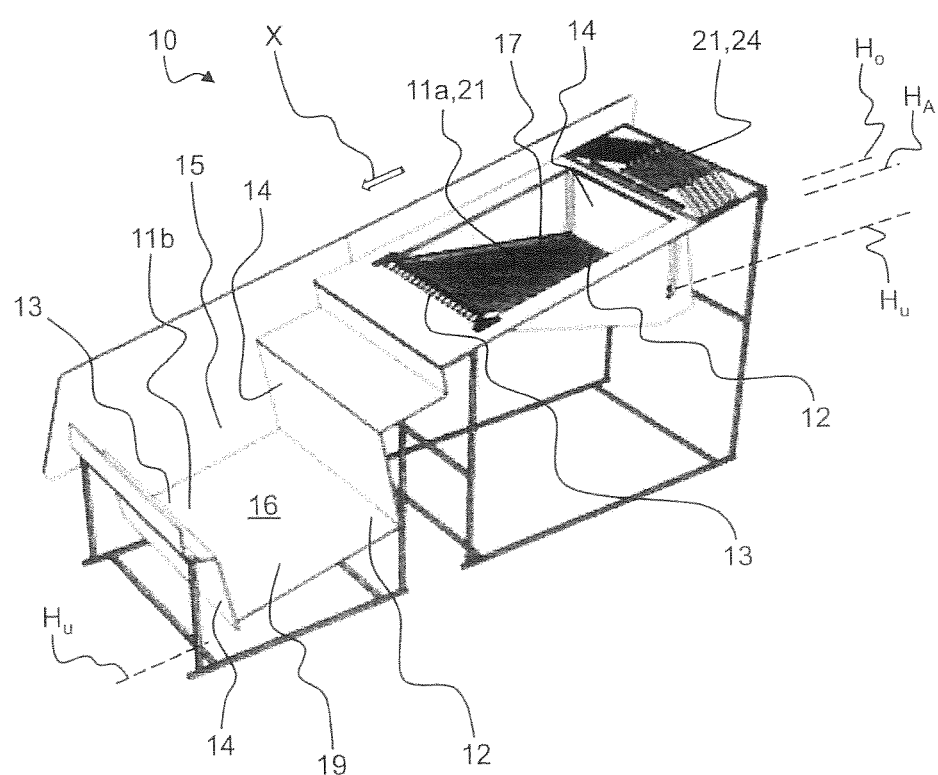

FIG. 6 shows a further embodiment of the terminal device 10 according to the invention, which, viewed in the conveying direction X, comprises an accumulation roller conveyor 24, a first transport device 11a and a second transport device 11b. In the illustration of FIG. 6, both the first and the second transport devices 11a, 11b are in a transport position, that is, the charge side 12 of the first transport device 11a and the entire transport device 11b are each set in the upper position $H_o$. In FIG. 7 the first and second transport devices 11a, 11b of the terminal device 10 according to FIG. 6 are arranged in the lower position $H_u$, which in operation corresponds with a loaded state of goods 40.

The accumulating roller conveyor 24 simultaneously forms the incoming-side conveying means 21 for the first transporting device 11a and the first transporting device 11a forms the incoming-side conveying means 21 for the second transporting device 11b.

The first transport device 11a is formed in the present embodiment as a belt conveyor 17 in the form of a strip belt conveyor.

The belt conveyor 17 is rotatably mounted in the region of its discharge side 13 with a predetermined height level $H_A$ and the charge side 12 is pivotally arranged between the upper position $H_o$ shown in FIG. 6 and the lower position $H_u$ for storing goods 40 (not shown) according to FIG. 7.

In a substantially empty terminal device 10, goods 40 are initially transported via the first transport device 11a and fall down from this onto the second transport device 11b. The second transport device 11b is shown by way of example as a chute 19 in FIG. 6 and FIG. 7, but could also be a belt conveyor 17, a roller conveyor 18, an air or ball table (not shown).

The second transport device 11b is movably mounted exclusively in a translatory direction of movement Z and is located with the charge side 12 and the discharge side 13 in the upper position $H_o$. Due to the restraint-guided support of the second transport device 11b, the charge side 12 and the discharge side 13 always take simultaneously their corresponding upper or lower position $H_o$, $H_u$. The corresponding upper or lower position $H_o$, $H_u$ is adjustable by means of a fluid cylinder 31, which preferably engages in the centre of mass M from below the second transport device 11b.

The chute 19 of the second transport device 11b is bounded in the conveying direction X on both sides by a stationary holdback wall 14 and laterally surrounded by opposite sidewalls 14a, from which only the rear sidewall 14a is shown in the image plane for reasons of clarity. The two sidewalls 14a and the two holdback walls 14 adjoin one another alternately in the circumferential direction and form a box-shaped storage space 15, in which goods 40 can be stacked in a plurality of planes, in particular in the lower position $H_u$ of the second transport device 11b.

LIST OF REFERENCE NUMBERS 10 terminal device
11 transport device
11a first transport device
11b second transport device
12 charge side
13 discharge side
14 holdback wall
14a sidewall
15 storage space
16 transport path
17 belt conveyor
17a upper run
17b lower run
17c conveyor belt
18 roller conveyor
19 chute
20 sorting and picking system
21 conveying means
22 unloading table
23 sorter
24 accumulating roller conveyor
30 drive unit
31 fluid cylinder
32 gallows
33 drum
34 hawser
35 pulley
36 electronic control unit
37 pedestal
38 servomotor
39 pivot bearing
40 goods
α inclination angle
$H_A$ height level discharge side
$H_o$ upper position
$H_u$ lower position
$H_W$ preselected loading height
M centre of mass
$S_{1-6}$ loading height sensor
X conveying direction
Z translatory direction of movement

What is claimed:

1. A terminal device for a sorting and picking system, the terminal device comprising:
at least one transport device having a charge side and a discharge side, wherein on the charge side goods of a conveying means can be loaded and stored on the transport device until the end of a loading cycle,
wherein at least the charge side of the transport device is lowered during the loading cycle from an upper position ($H_o$) to a lower position ($H_u$), and
wherein a loading height sensor ($S_{1-6}$) is arranged on the charge side and/or the discharge side of the at least one transport device.

2. The terminal device according to claim 1, wherein the charge side is lowerable below a level (HA) of the discharge side.

3. The terminal device according to claim 1, wherein the at least one transport device is pivotally mounted about its discharge side.

4. The terminal device according to claim 3, the discharge side of a first transport device is adjacent to the charge side of a second transport device, wherein the conveying means is composed of the first transport device, wherein the charge side is movable by means of a drive unit between the upper position ($H_o$) and the lower position ($H_u$), wherein the drive unit is connected to the charge side of the transport device, wherein the drive unit engages the transport device in the region of its centre of mass (M), and wherein the drive unit comprises a fluid cylinder and/or a linear drive.

5. The terminal device according to claim 1, wherein the charge side is lowered or raised together with the transport device in a translatory direction.

6. The terminal device according to claim 1, wherein the discharge side of a first transport device is adjacent to the charge side of a second transport device, wherein the conveying means is composed of the first transport device.

7. The terminal device according to claim 1, wherein the charge side is movable by means of a drive unit between the upper position (Ho) and the lower position (Hu).

8. The terminal device according to claim 7, wherein the drive unit is connected to the charge side of the at least one transport device.

9. The terminal device according to claim 7, wherein the drive unit engages the at least one transport device in the region of its centre of mass (M).

10. The terminal device according to claim 7, wherein the drive unit comprises a fluid cylinder or a linear drive.

11. The terminal device according to claim 7, wherein a gallows is arranged above the at least one transport device and the drive unit cooperates with a drum a hawser placed thereon, wherein the drive unit or a pulley is attached on the gallows.

12. The terminal device according to claim 1, wherein the at least one transport device has a transport path from an upper run of a belt conveyor, a roller conveyor, a ball table, a pneumatic table or a chute.

13. A terminal device for a sorting and picking system, the terminal device comprising:
at least one transport device having a charge side and a discharge side, wherein on the charge side goods of a conveying means can be loaded and stored on the transport device until the end of a loading cycle,
wherein at least the charge side of the transport device is lowered during the loading cycle from an upper position ($H_o$) to a lower position ($H_u$) so that pieces of goods can be stored in multiple layers on the transport device, and
wherein a substantially vertically aligned holdback wall is arranged between the charge side of the transport device and a discharge side of an upstream conveying means preventing the pieces of goods from slipping down in the lower position (Hu) of the transport device.

14. The terminal device according to claim 13, wherein a loading height sensor ($S1_{1-6}$) is arranged on the charge side and/or the discharge side of the at least one transport device.

15. The terminal device according to claim 11, wherein the loading height sensor ($S1_{1-6}$) is formed of a light barrier, a light sensor or ultrasonic sensor.

16. The terminal device according to claim 11, wherein a plurality of transport devices are present, the associated (r) loading height sensor(s) ($S_{1-6}$) and their respective drive unit an electronic control unit are connected and when exceeding a predefinable loading height (Hw) of the first triggering loading height sensor ($S_{1-6}$) initiates a lowering of the associated discharge side.

17. The terminal device according to claim 13, wherein the at least one transport device is pivotally mounted about its discharge side.

18. The terminal device according to claim 17, wherein the discharge side of a first transport device is adjacent to the charge side of a second transport device, wherein the conveying means is composed of the first transport device, and wherein the charge side is movable by means of a drive unit between the upper position ($H_o$) and the lower position ($H_u$).

19. The terminal device according to claim 18, wherein the drive unit is connected to the charge side of the transport device, wherein the drive unit engages the transport device in the region of its centre of mass (M), and wherein the drive unit comprises a fluid cylinder or a linear drive.

20. The terminal device according to claim 18, wherein a gallows is arranged above the at least one transport device and the drive unit cooperates with a drum and a hawser placed thereon, wherein the drive unit or a pulley is attached on the gallows, wherein a loading height sensor ($S_{1-6}$) is arranged on the charge side or the discharge side of the at least one transport device, and wherein the loading height sensor ($S_{1-6}$) is formed of a light barrier, a light sensor or ultrasonic sensor.

21. The terminal device according to claim 20, wherein a plurality of transport devices are present, the associated (r) loading height sensor(s) ($S_{1-6}$) and their respective drive unit an electronic control unit are connected and when exceeding a predefinable loading height (Hw) of the first triggering loading height sensor ($S_{1-6}$) initiates a lowering of the associated discharge side, and wherein the at least one transport device has a transport path from an upper run of a belt conveyor, a roller conveyor, a ball table, a pneumatic table or a chute.

* * * * *